A. LEE.
HEADLIGHT ADJUSTER FOR AUTOMOBILES.
APPLICATION FILED APR. 21, 1916.
1,198,933.
Patented Sept. 19, 1916.
2 SHEETS—SHEET 1.
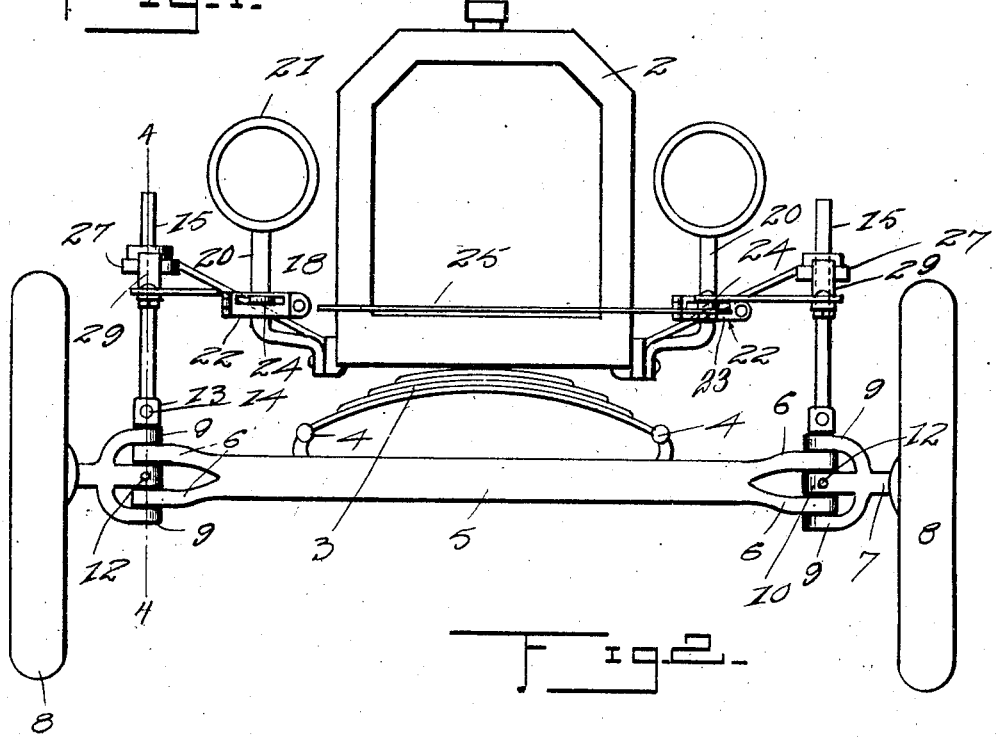
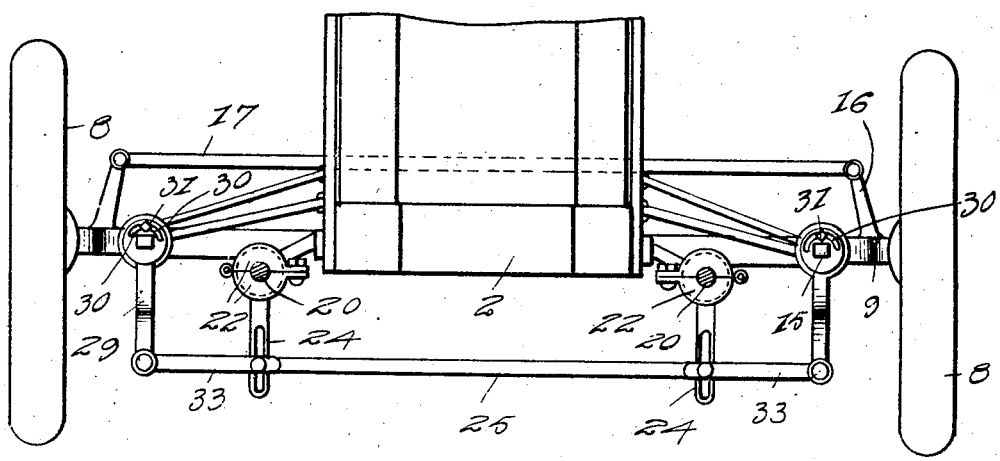
Inventor
A. Lee

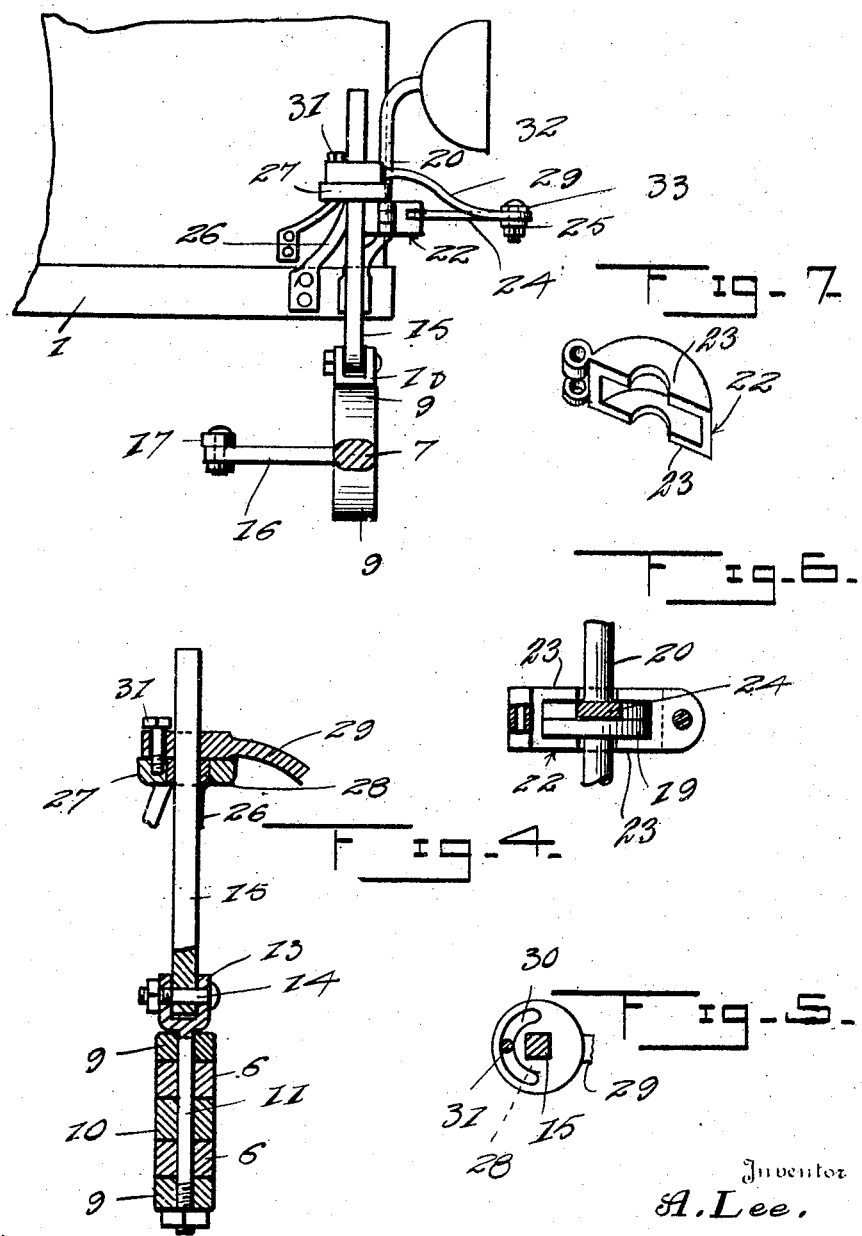

UNITED STATES PATENT OFFICE.

ALVIN LEE, OF FRANKFORT HEIGHTS, ILLINOIS, ASSIGNOR OF ONE-HALF TO ARTHUR R. MARTIN, OF FRANKFORT HEIGHTS, ILLINOIS.

HEADLIGHT-ADJUSTER FOR AUTOMOBILES.

1,198,933.  Specification of Letters Patent.  Patented Sept. 19, 1916.

Application filed April 21, 1916. Serial No. 92,645.

*To all whom it may concern:*

Be it known that I, ALVIN LEE, a citizen of the United States, residing at Frankfort Heights, in the county of Franklin and State of Illinois, have invented certain new and useful Improvements in Headlight-Adjusters for Automobiles; and I do hereby declare the following to be a full, clear, and exact description of the invention, such as will enable others skilled in the art to which it appertains to make and use the same.

This invention relates to a headlight adjuster for automobiles and more particularly to a means for automatically turning the headlights in the direction of the steering wheels of the automobile to illuminate the path of the steering wheels of the automobile at all times.

An object of this invention is to provide a novel form of lamp brackets which will permit the turning of the headlights upon turning of the steering wheels of the automobile.

Another object of this invention is to provide a novel means of operatively connecting the headlights to the stub axles of the automobile, whereby upon turning of the stub axles, the headlights will move in a corresponding direction to throw the rays of light in the path of the automobile when making a turn to the right or left.

A further object of this invention is to provide the means connecting the headlights to the stub axles of a construction that the front axle of the automobile will be free to move upwardly and downwardly without interfering with the operation of the headlights.

A still further object of this invention is the provision of a headlight adjuster for automobiles of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a front elevation of a headlight adjuster, constructed in accordance with my invention and applied to an automobile, Fig. 2 is a top plan view of the same illustrating the headlights removed, Fig. 3 is a side elevation, illustrating the means of connecting the headlights to the front axle of an automobile, Fig. 4 is a vertical sectional view taken on the line 4—4 of Fig. 1, looking in the direction indicated by the arrows, Fig. 5 is a fragmentary plan view of a lamp actuating rod, Fig. 6 is a detail view illustrating a means of securing the lamp standards to the lamp supporting brackets, and Fig. 7 is a perspective view of one section of a collar for rotatably securing the lamp standards to the lamp supporting brackets.

Referring in detail to the drawings, the numeral 1 indicates the chassis of an automobile, having a radiator 2 mounted on its forward end. Secured to the forward end of the chassis 1 is a front spring 3, having its ends pivoted to arms 4 carried by a front axle 5. The front axle 5 is provided with its ends bifurcated to form arms 6 which are provided with alining apertures. The stub axles 7 have steering wheels 8 journaled thereon and have formed thereon relatively spaced arms 9, which are provided with alining apertures. Formed on the stub axles 7 are arms 10 which are positioned between the arms 9 and are provided with apertures in their ends. The arms 9 of the stub axles 7 receive the arms 6 of the front axle 5 and the arms 10 extend between the arms 6, having the apertures of all of the arms arranged in vertical alinement with each other. Pins 11 extend through the apertures of the arms and are rigidly secured to the arms 10 by set screws 12 to cause the pins to turn upon turning of the stub axles 7. The upper ends of the pins 11 are formed to provide arms 13, which are apertured to receive bolts 14. Squared shafts 15 are provided with apertures in their lower ends and are positioned between the arms 13 and secured thereto by the bolts 14 passing through the apertures in the shafts 15. Formed on each of the stub axles 7 are rearwardly extending arms 16, which are pivotally connected together by a connecting rod 17, which is usually connected to the steering gear of the automobile for turning the steering wheels 8 in a corresponding direction.

Lamp brackets 18 are bolted or otherwise secured to the forward end of the chassis 1 upon each side thereof and are provided with bearings 19 formed on the free ends, the upper faces of which are flattened. Lamp standards 20, having their lower ends enlarged and flattened are positioned on the bearings 19 and provided with their upper ends reduced and secured to headlights 21 of any desired construction. In order to rotatably secure the lamp standards 20 to the bearings 19 collars 22 are provided, each of which are constructed of a pair of sections being hinged together at one of their ends and opposite ends bent to form securing arms, which may be detachably secured together in any suitable manner. The sections of the collars are provided with flanges 23 upon each edge thereof. The collars are placed around the bearings 19 and the lamp standards 20, having their flanges 23 overlying a portion of them to rotatably secure the lamp standards 20 to the bearings 19. The collars 22 are provided with elongated slots therein for allowing lamp actuating arms 24 to extend therethrough which are formed on the lamp standards 20. The arms 24 are connected together by a rod 25.

Substantially V-shaped supporting brackets 26 are bolted or otherwise secured to each side of the chassis 1 adjacent lamp supporting brackets 18 and are provided with bearings 27 which have journaled therein bushings 28, which are provided with squared bores to receive the squared shafts 15 and allow them to rotate and slide freely therein.

Lamp actuating rods 29 are provided with one of their ends enlarged and having squared bores to receive the squared shaft and rest upon the bearings 27. The enlarged ends of the lamp actuating rods 29 are provided with elongated curved slots 30 to receive bolts 31 that are threaded into the bearings 27 of the V-shaped supporting brackets 26 to rotatably secure the lamp actuating rods 29 to the V-shaped supporting brackets. The lamp actuating rods 29 extend forwardly and downwardly as illustrated at 32 and are pivotally connected to links 33 which are pivoted to the lamp actuating arms 24 by the same pivot means that connect the rods 25 to them.

From the foregoing description taken in connection with the accompanying drawings, it will be noted when the steering wheels 8 are turned, the stub axles 7 will turn the squared shafts 15 by the pins 11 and will turn the headlights 21 in a corresponding direction to throw the rays of light from the headlights in the path of the steering wheels 8 at all times. The squared shafts 15 are slidable through the V-shaped supporting brackets 26 and the lamp actuating rods 29 to allow the axle 5 to move upwardly and downwardly in relation with the chassis 1 caused by the automobile passing over uneven ground.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A headlight adjuster for automobiles comprising lamp supporting brackets, bearings formed on the ends of the lamp supporting brackets and provided with their upper faces flattened, lamp standards provided with their lower ends enlarged and flattened and positioned upon the bearings, collars surrounding the lamp standards and bearings, flanges formed on said collars and overlying the lamp standards and the bearings to rotatably secure the lamp standards to the bearings, headlights secured to said lamp standards, lamp actuating arms formed on the lamp standards and extending forwardly thereof, and means for operatively connecting the lamp actuating arms with the stub axles of an automobile to turn the headlights.

2. A headlight adjuster for automobiles comprising lamp supporting brackets secured to the chassis of an automobile, bearings formed on the ends of the lamp supporting brackets, lamp standards provided with their lower ends enlarged and flattened and positioned upon the bearings, sectional collars surrounding the lower ends of the lamp standards and bearings, flanges formed on the collars and overlying the lower ends of the lamp standards and bearings, said collars provided with elongated slots therein, lamp actuating arms formed on the enlarged lower ends of the lamp standards and extending through the slots in the collars, headlights secured to the lamp standards, and means for operatively connecting the lamp actuating arms with the stub axles of the automobile to turn the headlights.

3. A headlight adjuster comprising substantially V-shaped brackets secured to an automobile, bearings formed on the apex portions of the brackets, squared shafts journaled in said bearings, means for turning the shafts according to the direction of the front wheels of the automobile bearing, brackets secured to the automobile, lamp standards journaled in the last mentioned brackets, headlights carried by said standards, means for connecting the lamp standards together, and means for connecting the lamp standards to the squared shafts to turn the headlights.

4. A headlight adjuster comprising substantially V-shaped brackets secured to an automobile, bearings formed on the apex portions of the brackets, bushings journaled in said bearings and having squared openings therein, squared shafts journaled in said openings of the bushings, brackets secured to the automobile, lamp standards journaled in said brackets, headlights secured to said lamp standards, means for connecting the lamp standards together, lamp actuating rods secured to the shafts, and means for connecting the lamp actuating rods with the lamp standards.

5. A headlight adjuster comprising substantially V-shaped brackets, bearings formed on the apex portions of the brackets, squared shafts journaled in said bearings, means for turning the shafts according to the direction the front wheels of an automobile are turned, brackets secured to the automobile, lamp standards journaled in said brackets, headlights secured to said standards, means for connecting the lamp standards together, lamp actuating rods provided with one of their ends enlarged and apertured to receive the squared shafts and resting upon the bearings, said enlarged end of the lamp actuating rods having elongated arcuate-shaped slots, pins extending through the slots and carried by the bearings, and links connected to the lamp actuating rods and to the lamp standards for turning the headlights according to the movement of the squared shafts.

In testimony whereof I affix my signature in presence of two witnesses.

ALVIN LEE.

Witnesses:
Geo. W. Wright,
R. M. Wright.

Copies of this patent may be obtained for five cents each, by addressing the "Commissioner of Patents, Washington, D. C."